(12) United States Patent
Malik

(10) Patent No.: US 7,873,232 B2
(45) Date of Patent: Jan. 18, 2011

(54) METHOD AND SYSTEM FOR IMAGE BACKGROUND SUPPRESSION USING NEUTRAL ADJUSTMENT OF COLOR CHANNELS

(75) Inventor: Amal Malik, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 840 days.

(21) Appl. No.: 11/831,339

(22) Filed: Jul. 31, 2007

(65) Prior Publication Data

US 2009/0034869 A1 Feb. 5, 2009

(51) Int. Cl.
*G06K 9/40* (2006.01)
*H04N 1/46* (2006.01)

(52) U.S. Cl. .................................. 382/274; 358/505
(58) Field of Classification Search ............... 382/154, 382/163, 169, 274, 275, 305; 358/1.9, 3.26, 358/505; 345/591, 593, 603, 604
See application file for complete search history.

(56) References Cited

U.S. PATENT DOCUMENTS

| | | | |
|---|---|---|---|
| 5,450,502 A * | 9/1995 | Eschbach et al. ............ 382/169 |
| 6,198,845 B1 | 3/2001 | Tse et al. |
| 6,275,304 B1 * | 8/2001 | Eschbach et al. ............. 358/1.9 |
| 6,674,899 B2 | 1/2004 | Nagarajan et al. |
| 6,944,353 B2 | 9/2005 | Matsuda |
| 6,995,866 B2 * | 2/2006 | Feng et al. .................... 358/1.9 |
| 7,058,222 B2 | 6/2006 | Li et al. |
| 7,085,413 B2 * | 8/2006 | Huang et al. ................. 382/163 |
| 7,116,826 B2 | 10/2006 | Umeda et al. |
| 7,177,053 B2 * | 2/2007 | Smith et al. ................. 358/3.26 |
| 7,200,263 B2 * | 4/2007 | Curry et al. .................. 382/154 |
| 7,236,641 B2 * | 6/2007 | Curry et al. .................. 382/254 |
| 7,551,334 B2 * | 6/2009 | Li ................................. 358/518 |
| 2004/0052429 A1 | 3/2004 | Curry et al. |
| 2004/0071362 A1 | 4/2004 | Curry et al. |
| 2007/0019257 A1 | 1/2007 | Li |

* cited by examiner

*Primary Examiner*—Kanji Patel
(74) *Attorney, Agent, or Firm*—Fay Sharpe LLP

(57) ABSTRACT

Printing systems and methods are presented for image background and neutral adjustment of luminance-chrominance pixel values corresponding to a scanned image, in which white and black pixels are identified which have luminance values close to whitepoint and blackpoint values for the image, and which have chrominance values close to the chrominance neutral point. The chrominance values of these identified white and black pixels are selectively reduced based at least partially on proximity to the chrominance neutral point and chrominance of one or more neighboring pixels.

22 Claims, 10 Drawing Sheets

METHOD AND SYSTEM FOR IMAGE BACKGROUND SUPPRESSION USING NEUTRAL ADJUSTMENT OF COLOR CHANNELS

BACKGROUND

The present exemplary embodiment relates to document processing systems and more particularly to neutral correction or adjustment of scanned images. The disclosure finds particular utility in conjunction with background suppression in color scanning and copying systems and will be described with a particular reference thereto. However, the exemplary techniques and systems of this disclosure may alternatively be employed in other document processing systems and applications in which background suppression is desired for images. In most copiers, an original document is scanned by a digital scanner which converts the light reflected from the document into electrical charges representing the light intensity from predetermined areas (pixels) of the document, and is often characterized in a red-green-blue (RGB) color space. Background suppression may be applied in the original color space, or the scanned image data can first be converted to a luminance/chrominance color space such as CIELab, where the luminance value L for each pixel represents the dark to light lightness dimension or luminosity, with "a" and "b" values representing the chrominance components in a two-dimensional chrominance plane to define the difference between two different colors of the same luminous intensity. Background adjustment is often employed for improved rendering of scanned images in the scan and copy path of document processing systems such as color scanners and other multifunction devices, and is typically applied separately to luminance and chrominance channels of a set of luminance-chrominance pixel values corresponding to a scanned image. The pixels of image data are then processed to convert the pixels of image data into signals which can be utilized by the digital reproduction machine to recreate the scanned image. Background suppression is particularly advantageous to ensure that white regions in an original scanned document are imaged as white regions in a printed document, and is thus important to many customers. However, conventional background suppression techniques are limited and there remains a need for improved methods and apparatus for image background adjustment.

BRIEF DESCRIPTION

In the present disclosure, methods and systems are provided for image background suppression in which neutral adjustment of color channels is used for both the light and dark ends of the luminance spectrum, and in which chrominance information for neighboring pixels is selectively employed in adjusting pixels identified as being close to the whitepoint and blackpoint values for an image. In the past, background adjustment has been performed separately for the luminance and chrominance channels, and conventionally did not take into account the dark end of the luminance spectrum or the chrominance of neighboring pixels. The present disclosure may advantageously be employed in document processing systems and other applications in which scanned image data is to be reproduced to facilitate improved background adjustment while maintaining neutrality in the light and dark areas of the document.

Image background adjustment methods are provided in accordance with certain aspects of the disclosure, in which image luminance and chrominance values are received along with whitepoint and blackpoint (offset) value corresponding to an image, with white and black pixels being identified based on luminance value proximity to the whitepoint or blackpoint as well as on the chrominance proximity to the neutral point in the chrominance space. White pixels are identified as those scanned pixels having luminance values within a white offset value of the whitepoint value, as well as having chrominance values within a non-zero white chrominance threshold value of the chrominance neutral point. Similarly, the method includes identifying black pixels having luminance values within a black offset value of the blackpoint value and having chrominance values within a non-zero black chrominance threshold value of the neutral point that is less than the white chrominance threshold in certain embodiments. The method further provides for adjusting background pixels by selectively reducing the chrominance values (a, b) of the identified white and black pixels based at least partially on proximity to the chrominance neutral point and chrominance of at least one neighboring pixel.

In certain embodiments, the chrominance values are selectively set to the neutral point for identified white and black pixels with chrominance values within a chrominance adjustment threshold of the chrominance neutral point, where the chrominance adjustment threshold is less than the white and black chrominance threshold values, and the chrominance is selectively reduced by an amount equal to either the chrominance adjustment threshold or the average deviation from the neutral point for the remaining white and black pixels for which at least one neighboring pixel is an identified white or black pixel, respectively. In certain embodiments, moreover, the method provides for selectively further adjusting the chrominance values of at least one of the identified white and black pixels based on adjusted chrominance values of neighboring pixels.

Other aspects of the disclosure involve document processing systems that include a scanning component that produces a red-green-blue color pixel representation of an original image, a color space converter that converts values of red-green-blue pixels into corresponding luminance-chrominance pixel values, and a white and black pixel identification component. The identification component identifies white pixels as those pixels having luminance values within a white offset value of a whitepoint value associated with the image and having chrominance values within a non-zero white chrominance threshold value of a chrominance neutral point, and black pixels having luminance values within a black offset value of a blackpoint value associated with the image and having chrominance values within a non-zero black chrominance threshold value of the chrominance neutral point. A chrominance adjustment component is provided to selectively reduce chrominance values of the identified white and black pixels based at least partially on proximity to the chrominance neutral point and chrominance of at least one neighboring pixel, as well as a memory for storing original and adjusted pixel values corresponding to the image.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
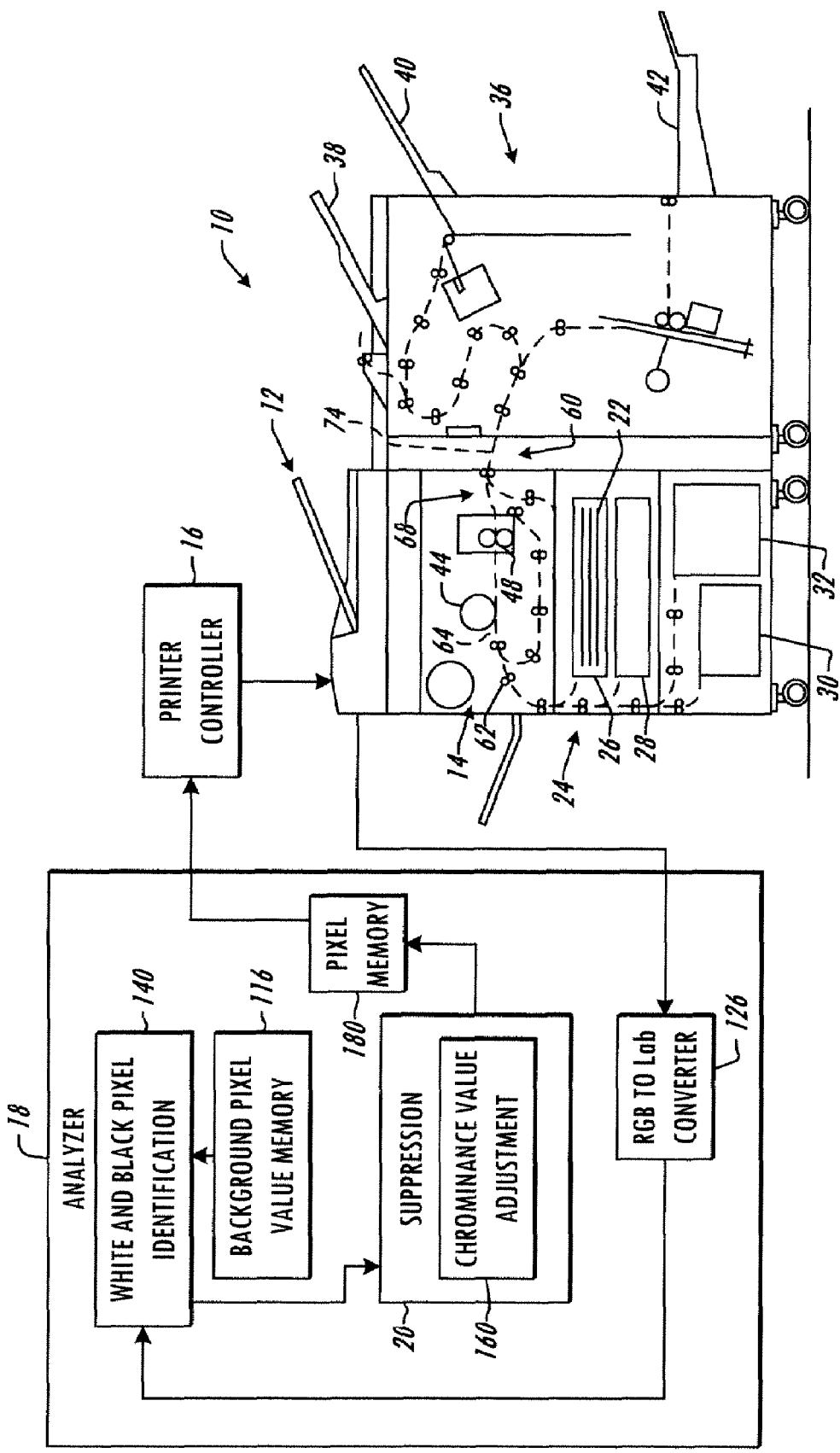
FIG. 1 is a schematic system level diagram illustrating an exemplary document processing system with a white and black pixel adjustment component and a chrominance value adjustment component in accordance with various aspects of the present disclosure.

Referring now to the drawings, FIG. 1 illustrates an exemplary document processing or printing system 10 in accordance with one or more aspects of the present disclosure. The printing system 10 can be any form of commercial printing apparatus, copier, printer, facsimile machine, or other system having a scanner or other input device 12 that scans an original document text and/or images to create an image comprising pixel values indicative of the colors and/or brightness of areas of the scanned original, and which preferably includes one or more marking engines or print engines 14 by which visual images, graphics, text, etc. are printed on a page or other printable medium, including xerographic, electro photographic, and other types of printing technology, wherein such components are not specifically illustrated to avoid obscuring the various alternate imaging features of the present disclosure. The print engine 14 may be any device or marking apparatus for applying an image from a printer controller 16 to printable media (print media) such as a physical sheet of paper, plastic, or other suitable physical media substrate for images, whether precut or web fed, where the input device 12, print engine 14, and controller 16 are interconnected by wired and/or wireless links for transfer of electronic data in between, including but not limited to telephone lines, computer cables, ISDN lines, etc. The print engine 14 generally includes hardware and software elements employed in the creation of desired images by electrophotographic processes wherein suitable print engines may also include ink-jet printers, such as solid ink printers, thermal head printers that are used in conjunction with heat sensitive paper, and other devices capable of printing an image on a printable media.

The image input device 12 may include conversion components for converting the image-bearing documents to image signals or pixels or such function may be assumed by the marking engine 14. In the illustrated embodiment, for example, the system 10 includes an analyzer component 18, which can be any suitable hardware, software, logic, or combinations thereof, whether implemented as a single component or as multiple interoperative components, that is comprised of an RGB-to-Lab converter 126, a white and black pixel identification component 140, a background pixel value memory 116, a suppression component 20 with a chrominance adjustment component 160, and a pixel memory 180 for storing original and adjusted pixel values corresponding to an input image. In this embodiment, the image input device 12 may be used to scan an original document to form red-green-blue (RGB) values, and the RGB to Lab converter component 126 converts the RGB data to CIELab pixel data having luminance (L) and chrominance (a, b) values for each pixel of the scanned image, where L represents the luminance/lightness component and a, b are the chrominance values. The identification component 140 receives the Lab input values and identifies certain of these as white or black pixels using whitepoint, blackpoint, and white and black offset values stored in the background pixel memory 116. The chrominance value adjustment component of the background suppression system 20 performs selective, adaptive background adjustment as illustrated and described further hereinafter with respect to FIGS. 5 and 6A-6E.

The illustrated printing engine 14 is fed with a print media sheets 22 from a feeding source 24 such as a paper feeder which can have one or more print media sources or paper trays 26, 28, 30, 32, each storing sheets of the same or different types of print media 22 on which the marking engine 14 can print. The printing engine 14 includes an imaging component 44 and an associated fuser 48, which may be of any suitable form or type, and may include further components which are omitted from the figure so as not to obscure the various aspects of the present disclosure. For instance, the printing engine 14 may include a photoconductive insulating member which is charged to a uniform potential and exposed to a light image of an original document to be reproduced. The exposure discharges the photoconductive insulating surface in exposed or background areas and creates an electrostatic latent image on the member corresponding to image areas of the original document. The electrostatic latent image on the photoconductive insulating surface is made visible by developing the image with an imaging material such as a developing powder comprising toner particles, which is then transferred to the print media and permanently affixed in the fusing process. In a multicolor electrophotographic process, successive latent images corresponding to different colors can be formed on the insulating member and developed with a respective toner of a complementary color, with each color toner image being successively transferred to the paper sheet in superimposed registration with the prior toner image to create a multi-layered toner image on the printed media 22, and where the superimposed images may be fused contemporaneously, in a single fusing process. The fuser 48 receives the imaged print media from the image-forming component and fixes the toner image transferred to the surface of the print media 22, where the fuser 48 can be of any suitable type, and may include fusers which apply heat or both heat and pressure to an image. Printed media from the printing engine 14 is delivered to a finisher 36 including one or more finishing output destinations 38, 40, 42 such as trays, stackers, pans, etc.

The document processing system 10 is operative to perform these scanning and printing tasks in the execution of print jobs, which can include printing selected text, line graphics, images, machine ink character recognition (MICR) notation, etc., on either or both of the front and back sides or pages of one or more media sheets 22. An original document or image or print job or jobs 50 can be supplied to the printing system 10 in various ways. In one example, the built-in optical scanner 12 may be used to scan a document such as book pages, a stack of printed pages, or so forth, to create a digital image of the scanned document that is reproduced by printing operations performed by the printing system 10. Alternatively, the print jobs can be electronically delivered to the system controller 16 via a network or other means, for instance, whereby a network user can print a document from word processing software running on a network computer, thereby generating an input print job.

In the system 10, moreover, a print media transporting system or network or highway 60 links the print media source 24, the print or marking engine 14 and a finisher 36 via a network of flexible automatically feeding and collecting drive members, such as pairs of rollers 62, spherical nips, air jets, or the like, along with various motors for the drive members, belts, guide rods, frames, etc. (not shown), which, in combination with the drive members, serve to convey the print media along selected pathways at selected speeds. In the example of FIG. 1, print media 22 is delivered from the source 24 to the print engine 14 via a pathway 64 common to the input trays 26, 28, 30, 32, and is printed by the imaging component 44 and fused by the fuser 48, with a pathway 68 from the printer 14 merging into a pathway 74 which conveys the printed media to the finisher 36, where the pathways 64, 68, 74 of the network 60 may include inverters, reverters, interposers, bypass pathways, and the like as known in the art. In addition, the print engine 14 may be configured for duplex or simplex printing and a single sheet of paper 22 may be marked by two or more print engines 14 or may be marked a plurality of times by the same marking engine 14, for instance, using internal duplex pathways.

Figure 2:
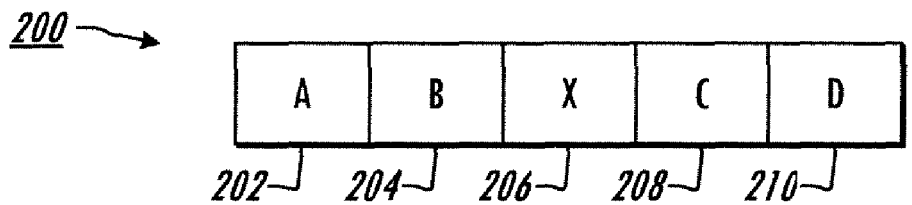
FIG. 2 is a schematic diagram illustrating a single dimensional 5×1 neighboring pixel window that may be employed in certain embodiments of the system of FIG. 1.
Figure 3:
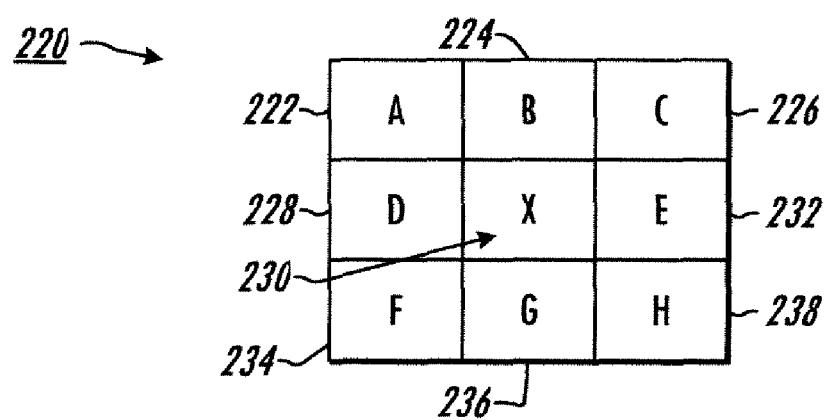
FIG. 3 is a schematic diagram illustrating a multi-dimensional 3×3 neighboring pixel window that may be employed in embodiments of the system of FIG. 1.

Referring also to FIGS. 2-5, in accordance with various aspects of the present disclosure, the document processing system 10 includes an improved analyzer component 18 for image background suppression of the chrominance channels which employs selective neutral adjustment in the white and black areas of a scanned image using chrominance information for neighboring white and black pixels. The neighboring pixels can be analyzed according to any suitable neighboring pixel window of size m×n, where m is an integer greater than or equal to two and n is an integer greater than or equal to one. FIG. 2 illustrates one exemplary single dimensional 5×1 neighboring pixel window 200 that may be employed in certain embodiments of the system of FIG. 1, including the pixel of interest "X" 206 as well as two neighboring pixels A, B 202 and 204 and C, D 208 and 210 on either side of the pixel 206. An exemplary multi-dimensional 3×3 neighboring pixel window 220 is shown in FIG. 3, including neighbor pixels A-H 222, 224, 226, 228, 232, 234, 236, and 238 surrounding the pixel of interest 230.

Figure 4:
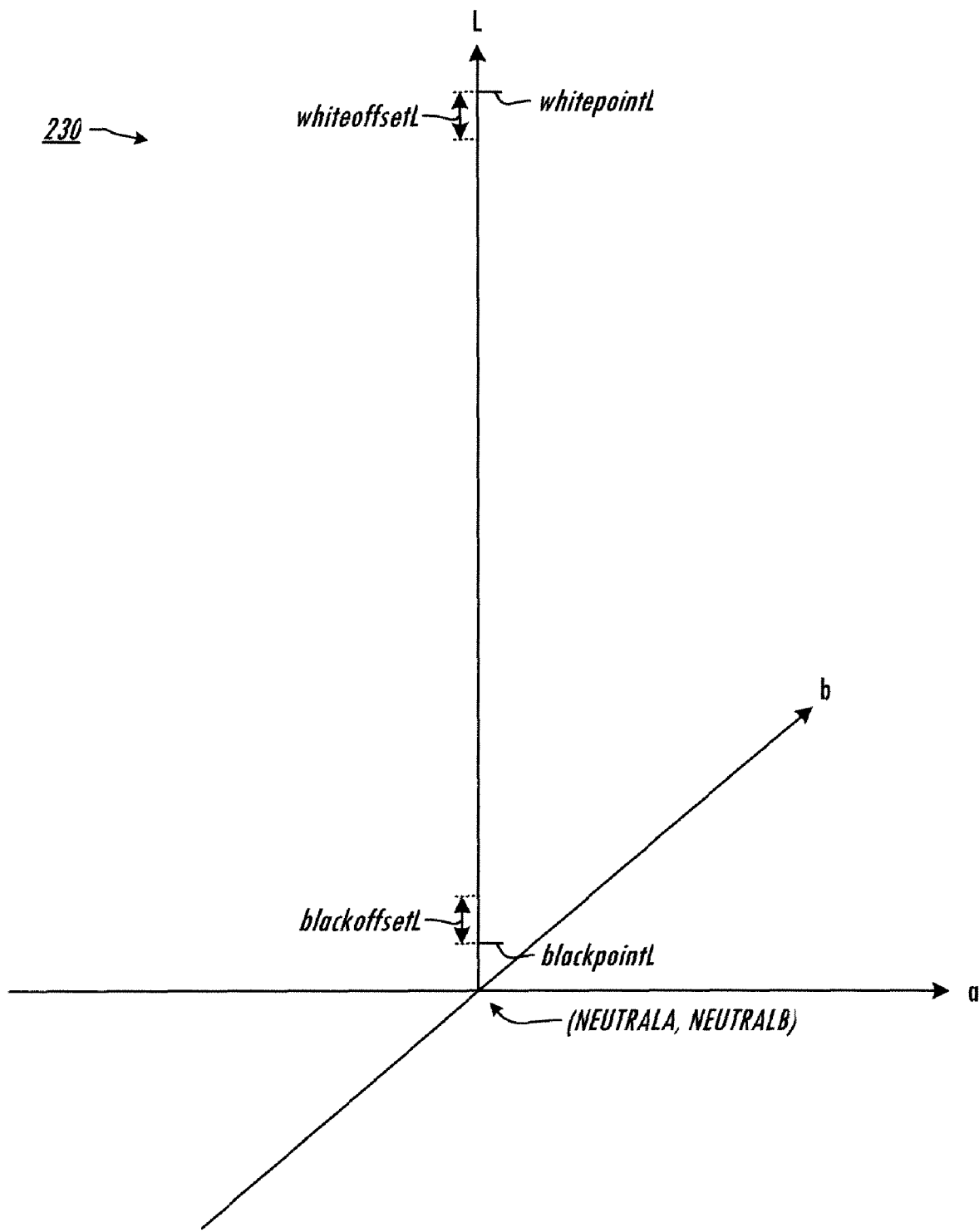
FIG. 4 is a schematic diagram illustrating an exemplary CIELab luminance-chrominance color space with white and black pixel offset values and a chrominance neutral point.

FIG. 4 illustrates an exemplary CIELab luminance-chrominance color space 230 with orthogonal L, a, and b axes, including exemplary whitepoint and blackpoint values (whitepointL and blackpointL) with predefined or system programmable white and black pixel offset values (whiteoffsetL and blackoffsetL) and a chrominance neutral point (NEUTRALA, NEUTRALB). In one example, NEUTRALA and NEUTRALB are programmable according to the luminance-chrominance space being utilized, such as 128 for both NEUTRALA and NEUTRALB for CIELab and YCbCr images, whereas for FAXLAB images these values could be 128 and 96.

The exemplary analyzer 18 in one example uses pre-determined whitepoint and blackpoint values whitepointL and blackpointL, which are luminance channel offsets for a given image, which can be provided with a scanned or input image, or which can be determined by the analyzer 18 using any suitable technique. In particular, the programmable offsets whiteoffsetL and blackoffsetL define luminance ranges or bands around the values whitepointL and blackpointL used by the system 10 to identify white and black pixels, where the offsets whiteoffsetL and blackoffsetL may but need not be equal to one another.

Figure 5:
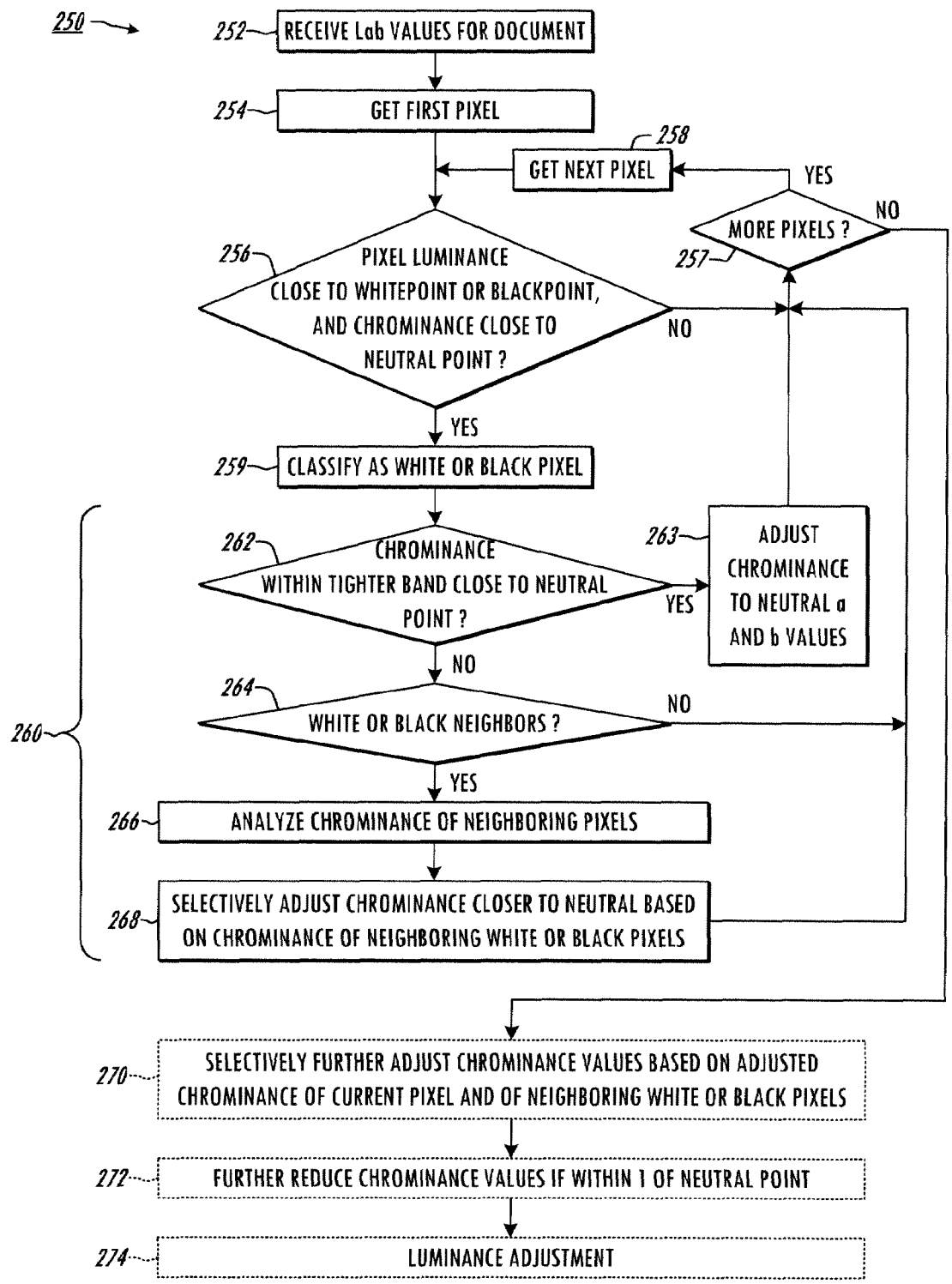
FIG. 5 is a flow diagram illustrating an exemplary background adjustment method in accordance with certain aspects of the present disclosure.

The analyzer 18 operates generally in accordance with the method 250 of FIG. 5 to suppress background in the color channels a and b thus making them more neutral without affecting the color of non-background areas, using an adaptive technique according to the amount of deviation of the neighboring pixels from the neutral point. While the exemplary method 250 and other methods are illustrated and described hereinafter in the form of a series of acts or events, it will be appreciated that the various methods in the claims below are not limited by the illustrated ordering of such acts or events except as specifically set forth therein. In this regard, except as specifically provided in the claims, some acts or events may occur in different order and/or concurrently with other acts or events apart from those acts and ordering illustrated and described herein, and not all illustrated steps may be required to implement a process or method in accordance with the present disclosure. The methods, moreover, may be implemented in hardware, software, or combinations thereof, in order to provide the described functionality, wherein these methods can be practiced in hardware and/or software of the above described systems or other hardware and/or software operatively associated with a printing system, wherein the disclosure is not limited to the specific applications and implementations illustrated and described herein.

The method 250 begins in FIG. 5 with receipt at 252 by the identification component 140 of luminance-chrominance pixel values (Lab) for the document imaged by the scanner 12. The identification component 140 utilizes the whitepoint value whitepointL and the blackpoint value blackpointL corresponding to the scanned image, and processes the pixel data sequentially beginning with a first pixel at 254. In operation according to the process 250, the identification component 140 identifies each pixel as white or black or neither according to the pixel luminance and chrominance at 256 and 257, and for white and black pixels, the chrominance adjustment component 160 of the background suppression system 20 performs selective chrominance reduction at 260. In particular, a determination is made at 256 as to whether the current pixel luminance value L is close to the whitepoint or blackpoint values and if so, whether the pixel chrominance is close to the neutral point. If not (NO at 256), no adjustment is done, and a determination is made at 257 as to whether more pixels remain. If so (YES at 257), the analyzer 18 gets the next pixel at 258 and proceeds to 256.

In one implementation of the proximity testing at 256, the identification component 140 identifies white pixels as those that have luminance values L within a white offset value whiteoffsetL of the whitepoint value whitepointL (e.g., L is greater than or equal to whitepointL−whiteoffsetL) and which have chrominance values a and b within a non-zero white chrominance threshold value of the chrominance neutral point NEUTRALA, NEUTRALB. Similarly, the component 140 identifies black pixels at 256 as those having luminance values L within the black offset value blackoffsetL of the blackpoint value and having chrominance values a and b within a black chrominance threshold value of the chrominance neutral point, where the white and black threshold values may be the same or the white chrominance threshold value is greater than the black chrominance threshold value in one possible embodiment.

If the current pixel luminance is close to the whitepoint or blackpoint and the pixel chrominance is near the neutral point (YES at 256), the current pixel is classified or identified as a white or black pixel at 259, and the method 250 proceeds to 260 where the chrominance adjustment component 160 (FIG. 1) selectively reduces the chrominance values a and b based at least partially on proximity to the chrominance neutral point NEUTRALA, NEUTRALB and chrominance of at least one neighboring pixel. A determination is made at 262 as to whether the chrominance of the identified white or black pixel is within a tighter range or band close to the chrominance neutral point, where the chrominance adjustment threshold is less than the white chrominance threshold value and also less than the black chrominance threshold value. If so (YES at 262), the chrominance values a and b are adjusted to the neutral point values NEUTRALA and NEUTRALB, respectively, at 263, and the process returns to determine if further pixels remain at 257 as described above. In one implementation at 262, the adjustment component determines if the identified white or black pixel has chrominance values within a chrominance adjustment threshold of the chrominance neutral point NEUTRALA, NEUTRALB, and if so, adjusts the chrominance values at 263 to the neutral point (a is set to NEUTRALA, and b is set to NEUTRALB).

For remaining identified white and black pixels with chrominance values not within the chrominance adjustment threshold of the neutral point (NO at 262), the adjustment component 140 determines at 264 whether the pixel of interest has any white or black neighbor pixels. If not (NO at 264), no adjustment is made to the current pixel and the process returns to 257 as described above. Otherwise (YES at 264), the component 140 analyzes the chrominance of neighboring white or black pixels at 266 and selectively reduces the chrominance values a and b at 268 based on the chrominance of neighboring white or black pixels.

Once all the pixels have been processed (NO at 257), these are stored in memory (e.g., in the pixel memory 180 in FIG. 1), and the chrominance of identified black and white pixels can optionally be selectively further adjusted at 270 (reduced closer to the neutral point) based on adjusted chrominance values of neighboring pixels. In one implementation, the further adjustment at 270 includes adjusting the chrominance values a and b to the chrominance neutral point NEUTRALA and NEUTRALB, respectively, if the adjusted chrominance values of all the neighboring pixels are at the chrominance neutral point. In other possible embodiments, moreover, the selective further adjustment at 270 may be performed earlier, such as once the chrominance of all the pixels in the specified neighborhood have been adjusted in order to conserve memory usage in the analyzer 18. A further optional adjustment may be performed at 272, in which the chrominance values a and b for the pixels are selectively further adjusted to the chrominance neutral point NEUTRALA, NEUTRALB if the adjusted chrominance values are within one of the chrominance neutral point values NEUTRALA, NEUTRALB. Thereafter, luminance may be adjusted at 274 using any suitable techniques.

FIGS. 6A-6F provide a flow diagram 300 illustrating another exemplary selective and adaptive background adjustment method in accordance with the present disclosure, which may be implemented, for example, in the document processing system 10 of FIG. 1. An image is scanned or otherwise input at 302 (e.g. 1 via scanner 12 in FIG. 1), and the resulting RGB values are formed at 304 and stored in memory. These are then converted at 306 into Lab values, and the image whitepoint and blackpoint values (whitepointL and blackpointL) are detected or otherwise determined using any suitable techniques as are known.

At 310, the first Lab pixel is evaluated or analyzed with a determination being made at 312 as to whether the pixel luminance value L is near to the whitepoint (e.g., whether L≧(whitepointL−whiteoffset), where the whiteoffset in one example is about 10 for CIELab and is programmable. If not (NO at 312), the pixel is not identified as a white pixel and the process continues to determine whether the current pixel is to be classified as a black pixel at 322 as described below. If the luminance value L is within whiteoffset of the whitepoint (YES at 312), a determination is made at 314 as to whether the chrominance values a and b are within a white chrominance threshold TH1 of the neutral point (e.g., whether |(a−NEUTRALA)|<TH1, and |(b−NEUTRALB)|<TH1). If not (NO at 314), the process 300 continues at 330 with no adjustment to the pixel chrominance values a or b, the next pixel is retrieved and the method 300 returns to 312 as described above. If, however, the pixel luminance L is close to the whitepoint (YES at 312) and the pixel chrominance values a and b are sufficiently close to the neutral point (YES at 314), the pixel is identified as white at 316 and the method 300 continues at 340 in FIG. 6B as further described below.

If the current pixel is not sufficiently close to the whitepoint (NO at 312), a determination is made at 322 as to whether the pixel luminance L is within a black offset value blackoffset of the image black point (e.g., whether L≦(blackpointL+blackoffset). In one possible embodiment, the black offset value is programmable, and in another example has a value in the range of about 20 to 30. If not, (NO at 322), the pixel is not identified as a black pixel, and the process continues at 330 with no adjustment to the pixel chrominance values a or b, the next pixel is retrieved, and the method 300 returns to 312 as described above. If the pixel luminance L is within the programmable range of the blackpoint (YES at 322), a determination is made at 324 as to whether the pixel chrominance values a and b are within a black chrominance threshold TH3 of the neutral point (e.g., whether |(a−NEUTRALA)|<TH3, and |(b−NEUTRALB)|<TH3). If not (NO at 324), the process proceeds to the next pixel with no chrominance adjustment at 330 and 312 as described above. In an alternative embodiment, for pixels not identified as white or black (NO at 314, 322, or 324), the process 300 proceeds to 325 as described further below. Otherwise (YES at 324), the pixel is identified as black at 326 and the method 300 continues at 350 in FIG. 6B as described in greater detail below. In the exemplary implementation, the white and black chrominance thresholds are non-zero, with the white threshold TH1 being greater than the black threshold TH3, although other embodiments are possible using any suitable non-zero, positive thresholds TH1 and TH3, which may, but need not, be equal.

Figure 6A:
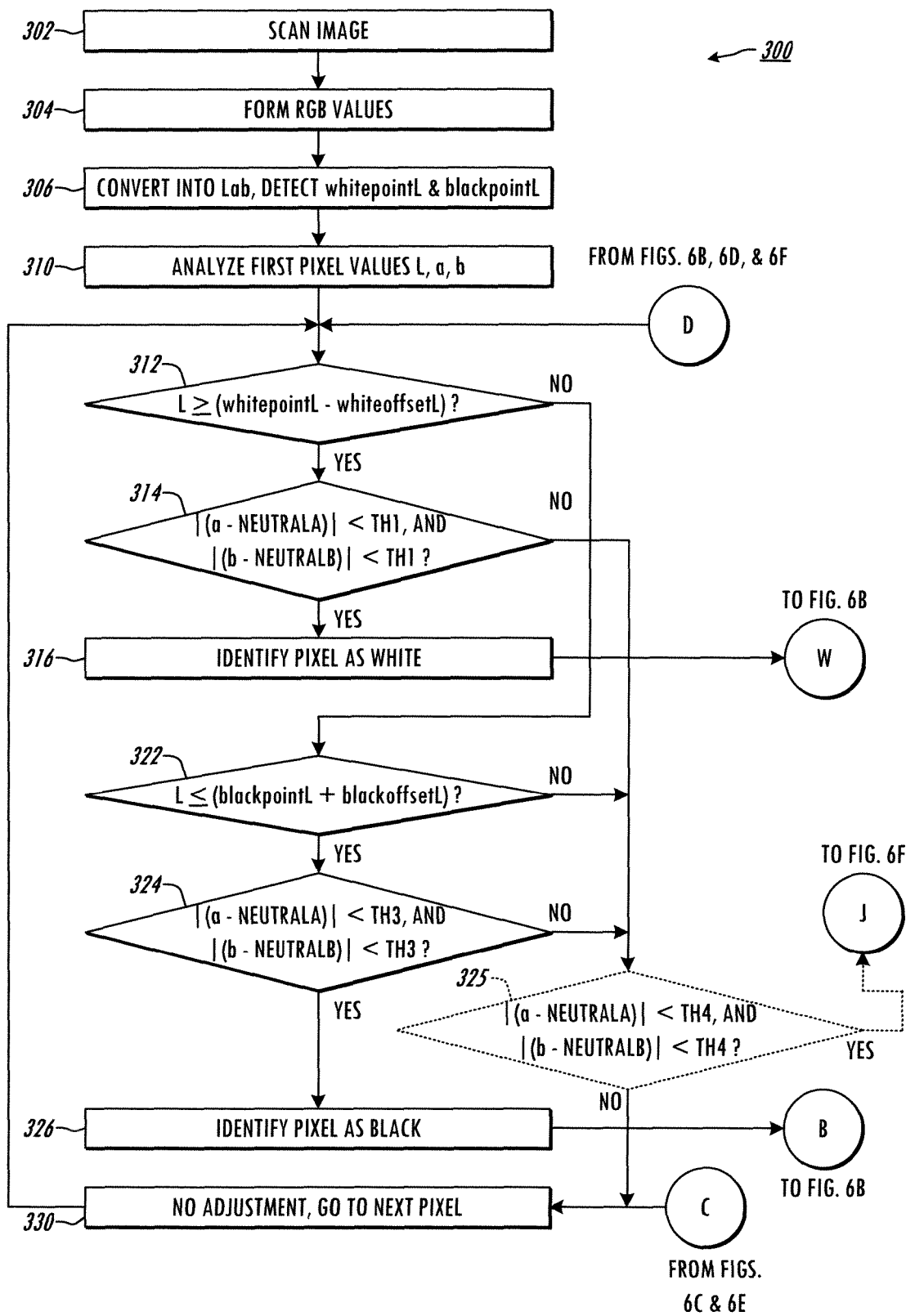
FIGS. 6A-6F depict a flow diagram illustrating another exemplary background adjustment method in accordance with the disclosure.
Figure 6B:
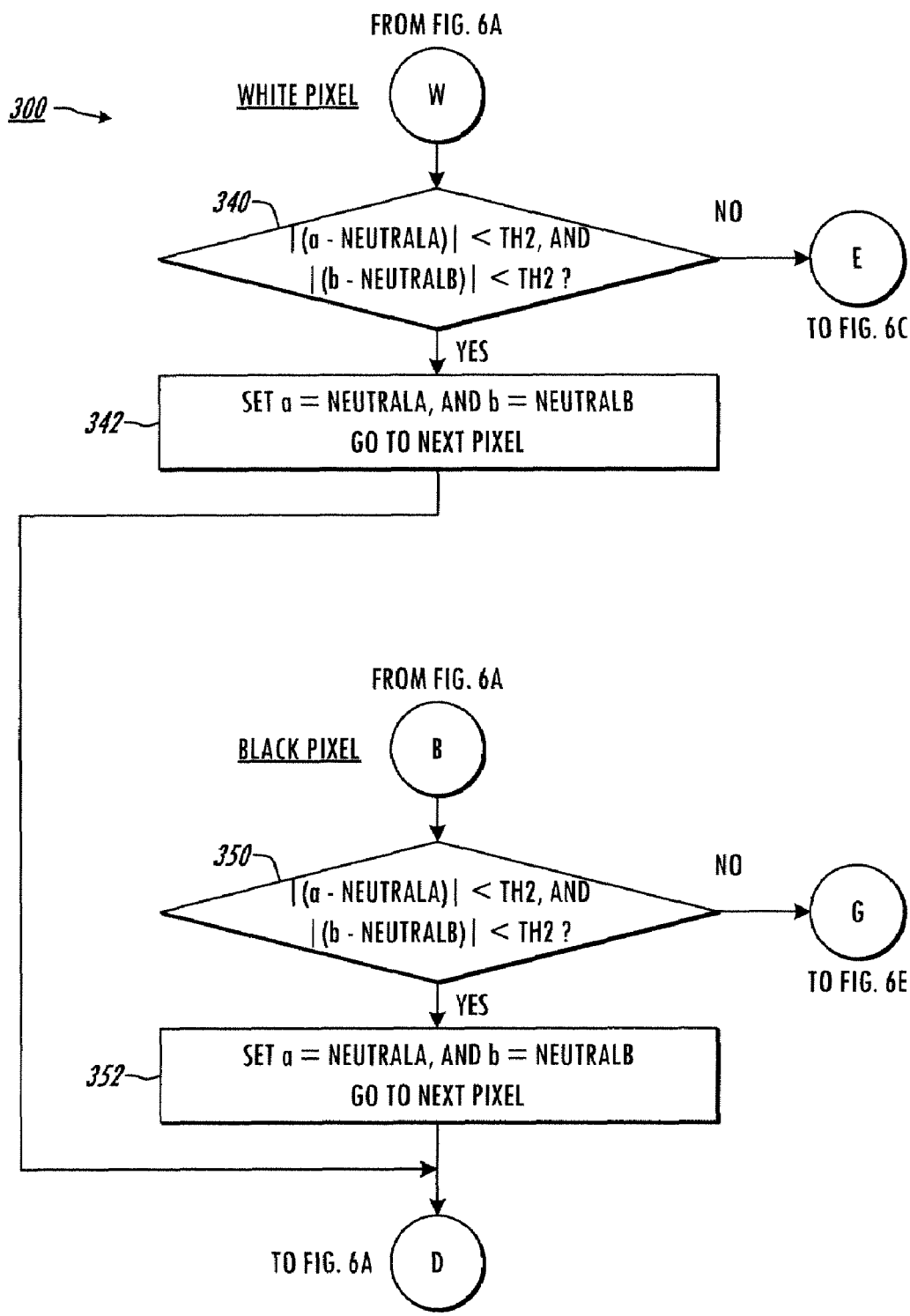

Turning now to FIG. 6B, the chrominance values a and b of pixels identified as white or black pixels are further compared to a narrower threshold range about the neutral point using a programmable chrominance adjustment threshold TH2 for selective chrominance adjustment (reduction) based on proximity to the neutral point (NEUTRALA, NEUTRALB) or on the chrominance of neighboring pixels. In one possible embodiment, TH2 is less than TH1 and also less than TH3, although other implementations are contemplated as falling within the scope of the present disclosure. For white pixels, the process 300 proceeds at 340 where a determination is made as to whether the chrominance values a and b are within the chrominance adjustment threshold TH2 of the neutral point (whether |(a−NEUTRALA)|<TH2, and |(b−NEUTRALB)|<TH2). If so (YES at 340), the pixel chrominance is adjusted to the neutral point at 342 (a is set to NEUTRALA, and b is set to NEUTRALB), and the process 300 returns to 312 in FIG. 6A to analyze the next pixel. Otherwise (NO at 340), the white pixel chrominance adjustment process 300 proceeds to 360 in FIG. 6C as described further below. Continuing in FIG. 6B, a determination is made for black pixels at 350 as to whether the chrominance values a and b are within the chrominance adjustment threshold TH2 of the neutral point, and if so (YES at 350), the black pixel chrominance is adjusted to the neutral point at 352, and the process 300 returns to 312 in FIG. 6A to analyze the next pixel. If not (NO at 350), the adjustment process 300 proceeds to 400 in FIG. 6E as described further below.

Figure 6C:
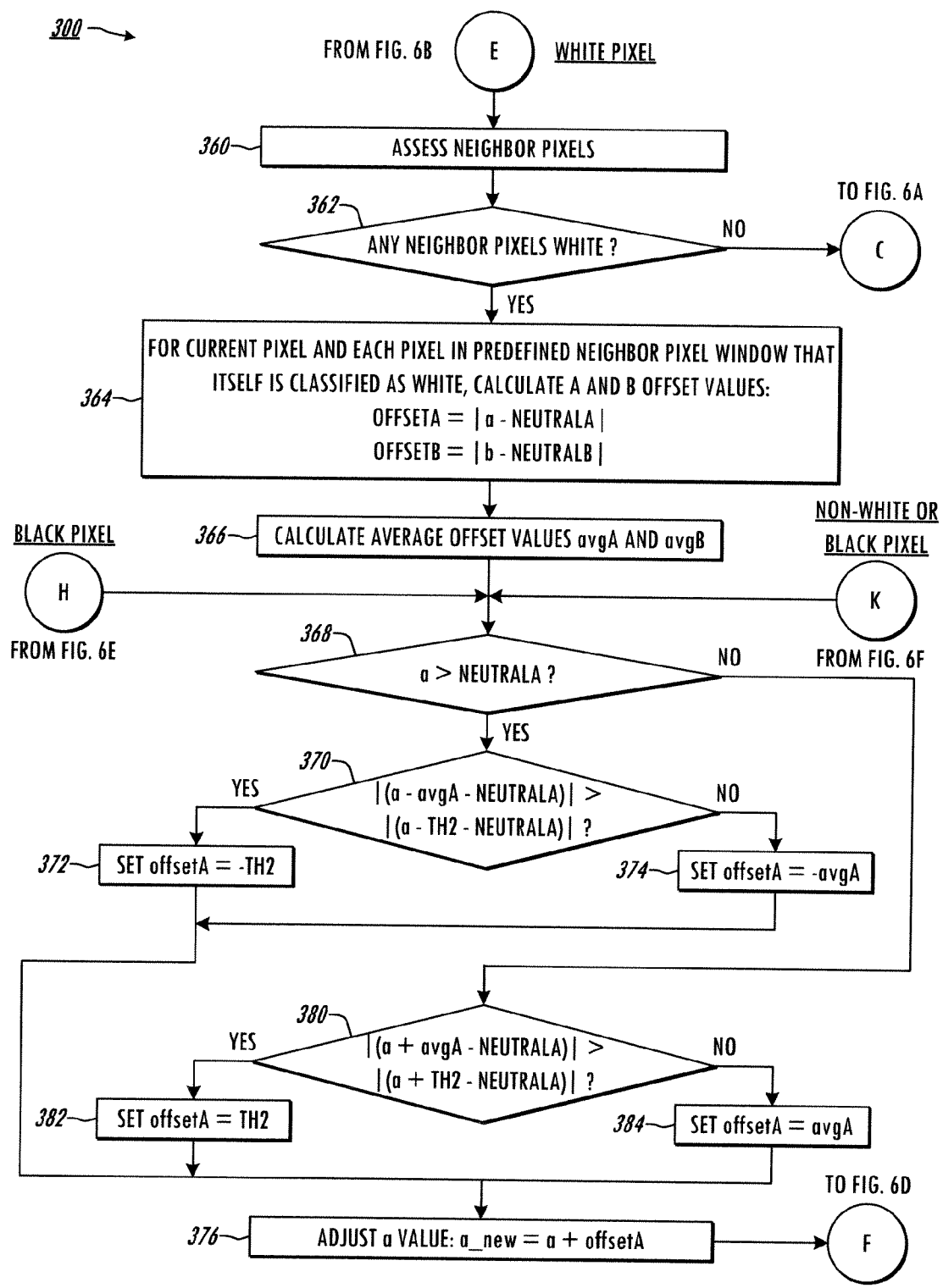

Referring now to FIG. 6C, for white pixels having chrominance outside the chrominance adjustment threshold TH2, the neighboring pixels are assessed at 360 with a determination being made at 362 as to whether any neighbor pixels are white. If not (NO at 362), the process 300 returns to 330 in FIG. 6A to get the next pixel with no chrominance adjustment to the current pixel as described above. If instead there is at least one neighboring white pixel (YES at 362 in FIG. 6C), chrominance value offsets are calculated at 364 for the a and b channels for the neighboring pixels classified as white, as well as the current pixel as deviations from the neutral point (OFFSETA=|a−NEUTRALA|, and OFFSETB=|b−NEUTRALB|), and an average offset is computed at 366 for each chrominance channel (avgA and avgB). For the first chrominance channel "a", a determination is then made at 368 as to whether the pixel a value is greater than the neutral point (e.g. whether a>NEUTRALA). If so (YES at 368), the chrominance "a" value is selectively offset toward the neutral point by an amount equal to the chrominance adjustment threshold or to the average white neighboring pixel "a" channel offset computed at 366. A determination is made at 370 as to whether |(a−avgA−NEUTRALA)|>|(a−TH2−NEUTRALA)|. If so (YES at 370), a pixel offset is set to −TH2 at 372, and otherwise (NO at 370), the offset is set to −avgA at 374, after which the "a" value is adjusted at 376 by the offset amount (a_new=a+offsetA). The pixel "a" value is similarly adjusted toward the neutral point NEUTRALA for cases where a is less than the neutral (NO at 368 above), where a determination is made at 380 as to whether |(a+avgA−NEUTRALA)|>|(a+TH2−NEUTRALA)|. If so (YES at 380), a pixel offset is set to TH2 at 382, and otherwise (NO at 380), the offset is set to avgA, after which the "a" value is adjusted at 376 by the offset amount (a_new=a+offsetA).

Figure 6D:
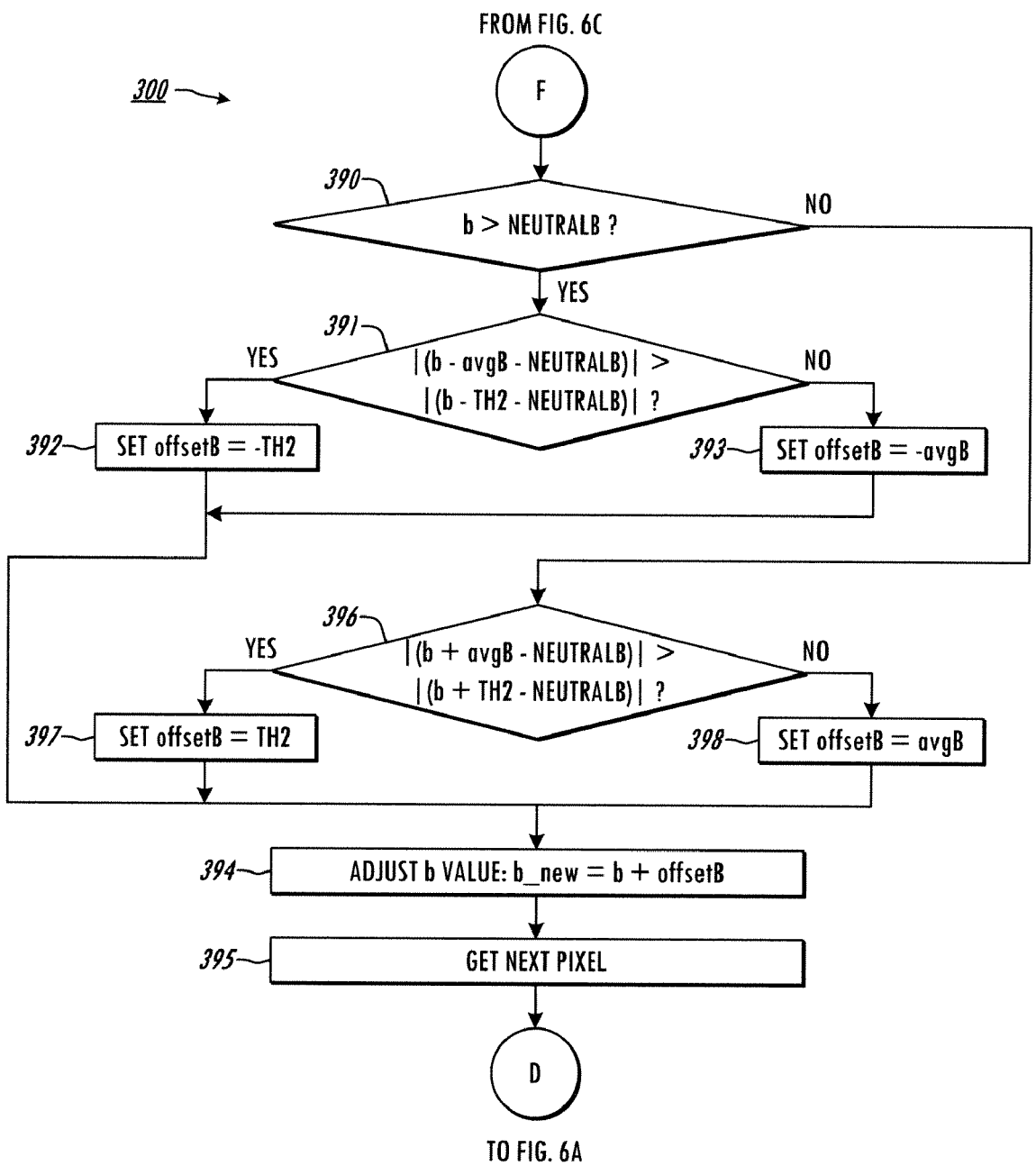

Referring also to FIG. 6D, following the selective "a" channel chrominance adjustment at 376, the process continues to 390 in FIG. 6D for adjustment of the "b" channel chrominance value. At 390, a determination is made as to whether the "b" channel chrominance exceeds the neutral point (b>NEUTRALB). If so (YES at 390), the "b" channel chrominance value is selectively offset toward the neutral point by an amount equal to the chrominance adjustment threshold or to the average white neighboring pixel "a" channel offset computed at 366 in FIG. 6C. A determination is made at 391 in FIG. 6D as to whether |(b−avgB−NEUTRALB)|>|(b−TH2−NEUTRALB)|. If so (YES at 391), a pixel offset is set to −TH2 at 392, and otherwise (NO at 391), the offset is set to −avgB at 393. Thereafter, the "b" value is adjusted at 394 by the offset amount (b_new=b+offsetB). For cases where b is less than the neutral (NO at 390), the pixel "b" value is similarly adjusted toward the neutral point NEUTRALB, where a determination is made at 396 as to whether |(b+avgB−NEUTRALB)|>|(b+TH2−NEUTRALB)|. If so (YES at 396), a pixel offset is set to TH2 at 397, and otherwise (NO at 396), the offset is set to avgB, after which the "b" value is adjusted at 394 by the offset amount (b_new=b+offsetB).

Figure 6E:
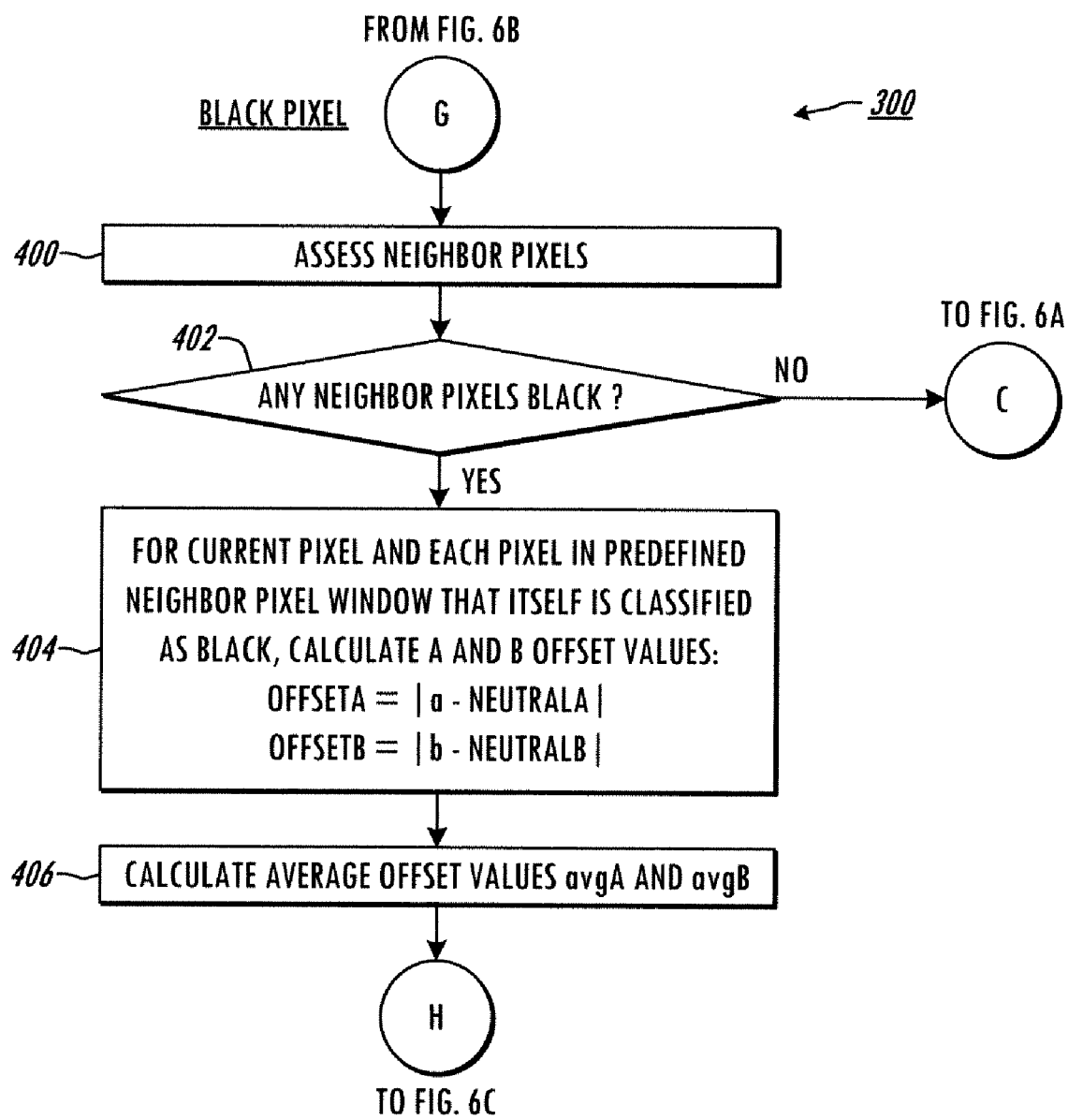

Once the a and b channel chrominance values have been adjusted for the white pixel at 376 and 396 in FIGS. 6C and 6D, respectively, the adjusted values are stored in the pixel memory (memory 180 in FIG. 1), the process 300 continues to get the next pixel at 395, and returns for adjustment processing at 312 in FIG. 6A as described above. Similar processing is undertaken for black pixels to selectively adjust the chrominance based on chrominance of neighboring black pixels. Referring to FIGS. 6B and 6E, for indentified black pixels with chrominance values not within the chrominance adjustment threshold TH2 of the neutral point (NO at 350 in FIG. 6B), the adjustment process 300 proceeds to assess neighbor pixels at 400 in FIG. 6E, where a determination is made at 402 as to whether any neighbor pixels are black. If not (NO at 402), the process 300 returns to 330 in FIG. 6A as previously described to get the next pixel with no chrominance adjustment to the current pixel. Otherwise (there is at least one neighboring black pixel, YES at 402 in FIG. 6E), a and b channel chrominance value offsets are calculated for the neighboring pixels classified as black as well as the current pixel at 404 as deviations from the neutral point (OFFSETA=|a−NEUTRALA|, and OFFSETB=|b−NEUTRALB|), and average offset values avgA and avgB are computed at 406 for each chrominance channel. Thereafter, the selective chrominance adjustment is undertaken for the black pixels as described above in connection with FIGS. 6C and 6D beginning at 368 in FIG. 6C, with the adjusted chrominance values a and b being stored along with the luminance value L in the pixel memory 180 of FIG. 1.

Figure 6F:
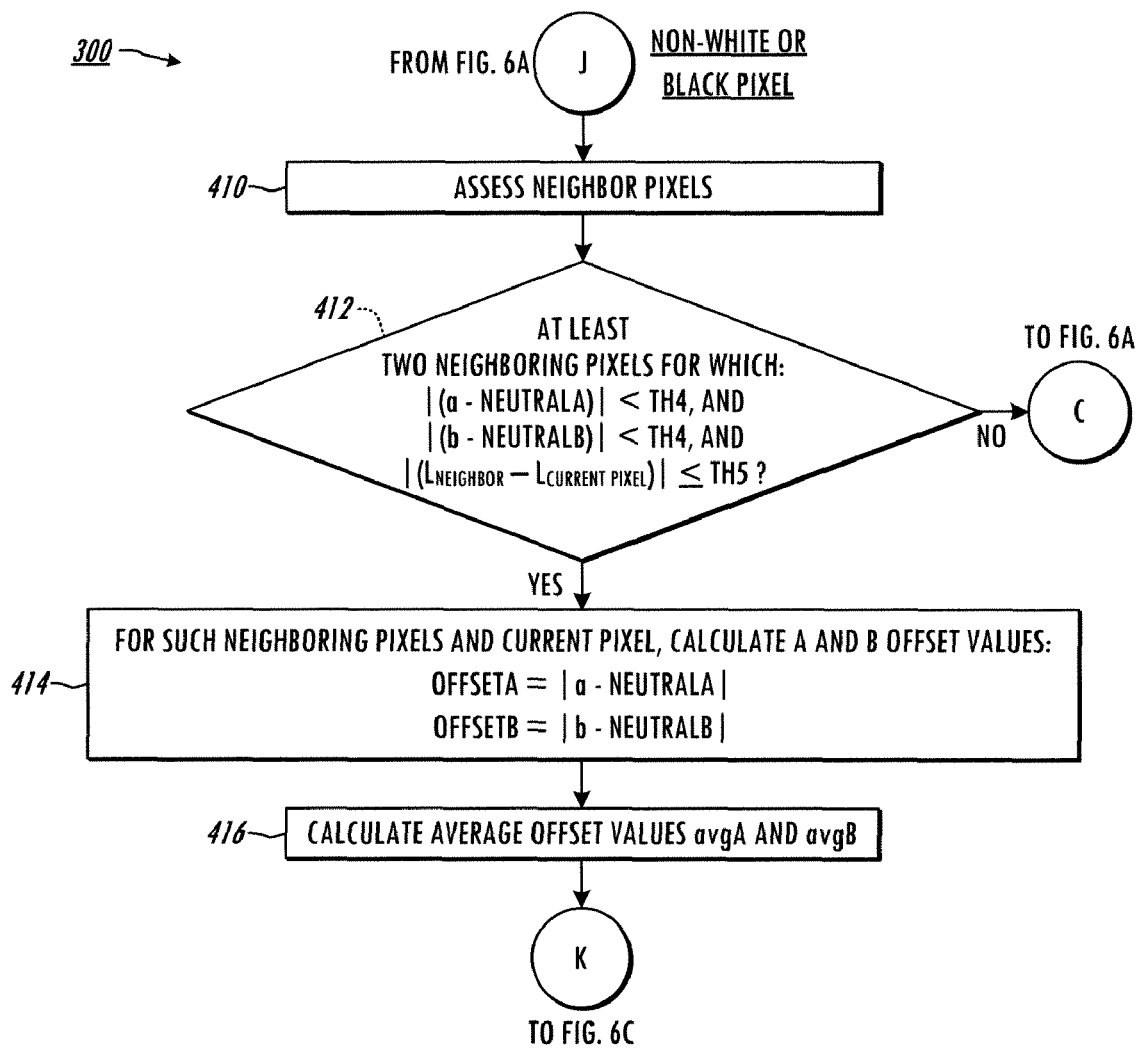

Referring now to FIGS. 6A and 6F, if the current pixel is not identified as white or black (NO at 314, 322, or 324 in FIG. 6A), a determination is made at 325 as to whether the current pixel chrominance values (a, b) are within a still narrower chrominance threshold TH4 of the neutral point (|(a−NEUTRALA)|<TH4, and |(b−NEUTRALB)|<TH4), where the narrow chrominance threshold TH4 in one embodiment is less than or equal to the chrominance threshold TH2 to avoid highlight clipping and not to change colors. If not (NO at 325), no adjustment is made to the current pixel chrominance, and the process proceeds to get the next pixel at 330 as described above. Otherwise (YES at 325 in FIG. 6A), the process 300 proceeds to selectively adjust the chrominance based on neighboring pixels in FIG. 6F. In this case, the non-white or black pixel chrominance adjustment includes assessing the neighboring pixels at 410 with a determination being made at 412 as to whether at least two of the neighboring pixels are also within the narrow chrominance threshold TH4 of the chrominance neutral point white (|(a−NEUTRALA)|<TH4, and |(b−NEUTRALB)|<TH4), and the neighboring pixel luminance L is within a certain threshold TH5 of the current pixel luminance (|($L_{NEIGHBOR}$−$L_{CURRENT\ PIXEL}$)|<TH5). If not (NO at 412), the process 300 returns to 330 in FIG. 6A to get the next pixel with no chrominance adjustment to the current pixel as described above. Otherwise (YES at 412 in FIG. 6F), chrominance value offsets are calculated at 414 for the a and b channels for the current pixel and for such neighboring pixels as deviations from the neutral point (OFFSETA=|a−NEUTRALA|, and OFFSETB=|b−NEUTRALB|). An average offset is computed at 416 for each chrominance channel (avgA and avgB), and the process 300 proceeds to 368 in FIG. 6C whereafter selective chrominance adjustment is undertaken for the current (non-white and non-black) pixel as described above in connection with FIGS. 6C and 6D, with the adjusted chrominance values a and b being stored along with the luminance value L in the pixel memory 180 of FIG. 1.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method of image background adjustment, the method comprising:
   receiving luminance-chrominance pixel values, a whitepoint value, and a blackpoint value which correspond to an image;
   using a hardware processing element identifying white pixels having luminance values within a white offset value of the whitepoint value and having chrominance values within a non-zero white chrominance threshold value of a chrominance neutral point;
   using the hardware processing element identifying black pixels having luminance values within a black offset value of the blackpoint value and having chrominance values within a non-zero black chrominance threshold value of the chrominance neutral point; and
   using the hardware processing element adjusting pixels by selectively reducing the chrominance values of the identified white and black pixels based at least partially on proximity to the chrominance neutral point and chrominance of at least one neighboring pixel.

2. The method of claim 1, wherein the white chrominance threshold value is greater than the black chrominance threshold value.

3. The method of claim 1, wherein selectively reducing the chrominance values of the identified white and black pixels comprises:
   for identified white and black pixels with chrominance values within a chrominance adjustment threshold of the chrominance neutral point, adjusting the chrominance values to the chrominance neutral point using the hardware processing element, the chrominance adjustment threshold being less than the white chrominance threshold value and less than the black chrominance threshold value;
   for remaining identified white pixels with chrominance values not within the chrominance adjustment threshold of the chrominance neutral point using the hardware processing element, selectively reducing the chrominance values of the remaining identified white pixels for which at least one neighboring pixel is an identified white pixel; and
   for remaining identified black pixels with chrominance values not within the chrominance adjustment threshold of the chrominance neutral point, selectively reducing the chrominance values of the remaining identified black pixels for which at least one neighboring pixel is an identified black pixel using the hardware processing element.

4. The method of claim 3:
   wherein selectively reducing the chrominance values of the remaining identified white pixels for which at least one neighboring pixel is an identified white pixel comprises:
   for each chrominance axis, computing an average deviation from the neutral point chrominance neutral point for identified white neighboring pixels and the current white pixel using the hardware processing element, and
   selectively adjusting the individual chrominance values by an amount equal to either the chrominance adjustment threshold or the average deviation from the chrominance neutral point for identified white neighboring pixels and current white pixel using the hardware processing element; and
   wherein selectively reducing the chrominance values of the remaining identified black pixels for which at least one neighboring pixel is an identified black pixel comprises:
   for each chrominance axis, computing an average deviation from the chrominance neutral point for identified black neighboring pixels and the current black pixel using the hardware processing element, and
   selectively adjusting the individual chrominance values by an amount equal to either the chrominance adjustment threshold or the average deviation from the neutral point for identified black neighboring pixels and current pixel using the hardware processing element.

5. The method of claim 4, comprising selectively further adjusting chrominance values of at least one of the identified white and black pixels using the hardware processing element based on adjusted chrominance values of neighboring pixels.

6. The method of claim 3, comprising selectively further adjusting chrominance values of at least one of the identified white and black pixels using the hardware processing element based on adjusted chrominance values of neighboring pixels.

7. The method of claim 1, comprising selectively further adjusting chrominance values of at least one of the identified white and black pixels using the hardware processing element based on adjusted chrominance values of neighboring pixels.

8. The method of claim 7, wherein further adjusting chrominance values comprises adjusting the chrominance values to the chrominance neutral point using the hardware processing element if the adjusted chrominance values of all the neighboring pixels are at the chrominance neutral point.

9. The method of claim 7, further comprising selectively further adjusting chrominance values of at least one of the identified white and black pixels to the chrominance neutral point using the hardware processing element if the adjusted chrominance values are within one of the chrominance neutral point.

10. The method of claim 1, further comprising selectively further adjusting chrominance values of at least one of the identified white and black pixels to the chrominance neutral point using the hardware processing element if the adjusted chrominance values are within one of the chrominance neutral point.

11. The method of claim 1, further comprising storing adjusted pixel values corresponding to the image in a memory using the hardware processing element.

12. The method of claim 1, further comprising:
   scanning an original document to produce a red-green-blue color pixel representation of an original image; and converting values of red-green-blue pixels of the red-green-blue color pixel representation into corresponding luminance-chrominance pixel values using the hardware processing clement.

13. The method of claim 1, further comprising identifying non-white and non-black pixels having chrominance values within a narrow chrominance threshold value of the chrominance neutral point using the hardware processing element; and selectively reducing the chrominance values of the identified non-white and non-black pixels using the hardware processing element based at least partially on chrominance of at least two neighboring pixels if at least two neighboring pixels have chrominance values within the narrow chrominance threshold value of the chrominance neutral point and have luminance values within a narrow luminance threshold value of the current pixel luminance value.

14. A document processing system, comprising:
a scanning component operative to produce a red-green-blue color pixel representation of an original image;
a red-green-blue color space to luminance-chrominance color space converter operative to convert values of red-green-blue pixels into corresponding luminance-chrominance pixel values;
a white and black pixel identification component operative to identify white pixels having luminance values within a white offset value of a whitepoint value associated with the image and having chrominance values within a non-zero white chrominance threshold value of a chrominance neutral point, and to identify black pixels having luminance values within a black offset value of a blackpoint value associated with the image and having chrominance values within a non-zero black chrominance threshold value of the chrominance neutral point;
a chrominance value adjustment component operative to selectively reduce chrominance values of the identified white and black pixels based at least partially on proximity to the chrominance neutral point and chrominance of at least one neighboring pixel; and
a memory for storing original and adjusted pixel values corresponding to the image.

15. The document processing system of claim 14, wherein the white chrominance threshold value is greater than the black chrominance threshold value.

16. The document processing system of claim 14, wherein the chrominance value adjustment component is operative to selectively reduce the chrominance values of the identified white and black pixels with chrominance values within a chrominance adjustment threshold of the chrominance neutral point to the chrominance neutral point; to selectively reduce the chrominance values of remaining identified white pixels for which at least one neighboring pixel is an identified white pixel for remaining identified white pixels with chrominance values not within the chrominance adjustment threshold of the chrominance neutral point; and to selectively reducing the chrominance values of remaining identified black pixels for which at least one neighboring pixel is an identified black pixel for remaining identified black pixels with chrominance values not within the chrominance adjustment threshold of the chrominance neutral point; where the chrominance adjustment threshold is less than the white chrominance threshold value and less than the black chrominance threshold value.

17. The document processing system of claim 16, wherein the chrominance value adjustment component is operative to selectively reduce the chrominance values of the remaining identified white pixels for which at least one neighboring pixel is an identified white pixel by computing average deviations from the chrominance neutral point for identified white neighboring pixels and current white pixel, and selectively adjusting the individual chrominance values by an amount equal to either the chrominance adjustment threshold or the average deviation from the neutral point for identified white neighboring pixels and current pixel; and wherein the chrominance value adjustment component is operative to selectively reduce the chrominance values of the remaining identified black pixels for which at least one neighboring pixel is an identified black pixel by computing an average deviation from the chrominance neutral point for identified black neighboring pixels, and by selectively adjusting the individual chrominance values by an amount equal to either the chrominance adjustment threshold or the average deviation from the neutral point chrominance neutral point for identified black neighboring pixels and current pixel.

18. The document processing system of claim 17, wherein the chrominance value adjustment component is operative to selectively further adjust chrominance values of at least one of the identified white and black pixels based on adjusted chrominance values of neighboring pixels.

19. The document processing system of claim 16, wherein the chrominance value adjustment component is operative to selectively further adjust chrominance values of at least one of the identified white and black pixels based on adjusted chrominance values of neighboring pixels.

20. The document processing system of claim 14, wherein the chrominance value adjustment component is operative to selectively further adjust chrominance values of at least one of the identified white and black pixels based on adjusted chrominance values of neighboring pixels.

21. The document processing system of claim 20, wherein the chrominance value adjustment component 160) is operative to further adjust chrominance values by adjusting the chrominance values to the chrominance neutral point if the adjusted chrominance values of all the neighboring pixels are at the chrominance neutral point.

22. The document processing system of claim 14, wherein the chrominance value adjustment component 160) is operative to further identify non-white and non- black pixels having chrominance values within a narrow chrominance threshold value of the chrominance neutral point, and to selectively reduce the chrominance values of the identified non-white and non-black pixels based at least partially on chrominance of at least two neighboring pixels if at least two neighboring pixels have chrominance values within the narrow chrominance threshold value of the chrominance neutral point and have luminance values within a narrow luminance threshold value of the current pixel luminance value.

* * * * *